United States Patent
Gottfried

(10) Patent No.: US 10,855,141 B2
(45) Date of Patent: Dec. 1, 2020

(54) POWER SUPPLY SYSTEM FOR PROVIDING POWER TO A LOAD AND FOR START-UP OF AN INTERNAL COMBUSTION ENGINE THAT PROVIDES POWER TO SUCH LOAD

(71) Applicant: POWER GROUP INTERNATIONAL CORPORATION, Laredo, TX (US)

(72) Inventor: Tomas Gottfried, Mexico City (MX)

(73) Assignee: Potencia Industrial LLC, Laredo, TX (US)

( * ) Notice: Subject to any disclaimer, the term of this patent is extended or adjusted under 35 U.S.C. 154(b) by 0 days.

(21) Appl. No.: 16/353,744

(22) Filed: Mar. 14, 2019

(65) Prior Publication Data
US 2020/0153311 A1 May 14, 2020

Related U.S. Application Data

(63) Continuation-in-part of application No. 15/811,104, filed on Nov. 13, 2017, now abandoned.

(51) Int. Cl.
| | |
|---|---|
| *H02K 7/20* | (2006.01) |
| *H02K 19/38* | (2006.01) |
| *H02K 7/18* | (2006.01) |
| *H02K 7/02* | (2006.01) |
| *H02K 11/042* | (2016.01) |
| *H02K 19/36* | (2006.01) |
| *F02N 11/04* | (2006.01) |
| *F02N 11/08* | (2006.01) |
| *H02K 11/28* | (2016.01) |
| *F16F 15/30* | (2006.01) |

(52) U.S. Cl.
CPC .......... *H02K 7/1815* (2013.01); *F02N 11/04* (2013.01); *F02N 11/087* (2013.01); *H02K 7/02* (2013.01); *H02K 7/20* (2013.01); *H02K 11/042* (2013.01); *H02K 11/28* (2016.01); *H02K 19/365* (2013.01); *H02K 19/38* (2013.01); *F16F 15/30* (2013.01)

(58) Field of Classification Search
CPC .......... H02K 7/1815; H02K 7/02; H02K 7/20; H02K 11/28; H02K 11/042; H02K 19/365; H02K 19/38; F02N 11/04; F02N 11/087; F16F 15/30
See application file for complete search history.

(56) References Cited

U.S. PATENT DOCUMENTS

| | | | | |
|---|---|---|---|---|
| 4,406,950 A | * | 9/1983 | Roesel, Jr. | ............... H02J 9/066 290/4 C |
| 4,460,834 A | * | 7/1984 | Gottfried | ............... H02J 9/066 290/30 A |

(Continued)

*Primary Examiner* — Tulsidas C Patel
*Assistant Examiner* — S. Mikailoff
(74) *Attorney, Agent, or Firm* — Egbert Law Offices, PLLC

(57) ABSTRACT

A power supply system includes a regulated power source that has an a synchronous machine, a flywheel with the shaft connected thereto, an electrical generator electrically connected through a switch to the synchronous machine of the regulated power source, an engine having a main shaft coupled to the shaft of the electrical generator, a power supply, and a switch connected between the electrical generator, the power supply and the regulated power source. The switch transfers power from the regulated power source to the electrical generator so as to cause the electrical generator to rotate the shaft in order to rotate the shaft of the engine during engine start-up.

11 Claims, 6 Drawing Sheets

(56) References Cited

U.S. PATENT DOCUMENTS

| | | | |
|---|---|---|---|
| 6,198,176 B1* | 3/2001 | Gillette | H02J 9/08 307/64 |
| 9,577,471 B2* | 2/2017 | Gottfried | H02J 9/066 |
| 2005/0173925 A1* | 8/2005 | Farkas | F01K 13/00 290/1 A |
| 2015/0229162 A1* | 8/2015 | Gottfried | H02J 9/066 307/65 |

* cited by examiner

POWER SUPPLY SYSTEM FOR PROVIDING POWER TO A LOAD AND FOR START-UP OF AN INTERNAL COMBUSTION ENGINE THAT PROVIDES POWER TO SUCH LOAD

CROSS-REFERENCE TO RELATED APPLICATIONS

The present application is a continuation-in-part of U.S. patent application Ser. No. 15/811,104, filed on Nov. 13, 2017, and entitled "Power Supply System and System for Providing Start-Up of Engines Used in such Power Supply System", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to power supply systems. More particularly, the present invention relates to uninterruptible power supply systems that utilize an internal combustion engine for supplying power during periods of power interruption. More particularly, the present invention relates to power supply systems using flywheel machines for causing an internal combustion engine of the power supply system to start-up.

2. Description of Related Art Including Information Disclosed Under 37 CFR 1.97 and 37 CFR 1.98

It is customary in situations of critical electrical power requirements to provide an auxiliary power source which can be switched to and from the load in the event of commercial power failure or excessive power variations. In some situations, however, the criticality of the load is such that interruptions or variations in power caused by such switching, although slight, cannot be tolerated. For example, during the countdown period prior to launch of a space vehicle, it is very important that the power supplying the load to the various computers and data equipment be uninterrupted. Typically, computer systems require a constant power supply. Interruptions in the power supply can erase memory and injure the software and hardware of the computer. Other situations where uninterruptible power supplies are considered important include: automatic banking services, automatic industrial processes, communication and signaling centers for maritime and aerial transportation, radio and television stations, and various emergency and security services.

Commercial power alone is generally not considered sufficiently reliable as a sole source of power for such usages. Interruptions commonly occur and loads may vary as other users come on and off the commercial power line. These problems are enhanced in the lesser developed countries where power systems are only in the initial stage of development.

Uninterruptible power systems are generally known within the prior art. Such uninterruptible power supplies usually comprise a generator and two prime movers, one of which normally drives the generator, and the other normally being stationary. When the normally operating prime mover ceases to function for any reason, the normally stationary prime mover is brought up to speed and is connected to drive the generator, usually through a clutch, thereby ensuring a continuous supply of current from the generator. Commonly, a kinetic energy supply and device such as a flywheel or a D.C. dynamoelectric machine is coupled to the generator and supplies energy thereto during the transitional period when the generator load is being transferred from one prime mover to the other. One prior art type of no-break power supply comprises an internal combustion engine adapted to be connected through a normally disengaged clutch to a flywheel, the flywheel being connected in turn to the rotor of an electric generator which in turn is connected to the rotor of an A.C. motor. Another prior art type of no-break power supply employs a D.C. dynamoelectric machine in place of the flywheel, both of these devices acting to supply kinetic energy during the aforementioned transitional period.

In the operation of a prior art no-break power supply of either of the aforementioned types, the generator and kinetic energy supplying device are normally driven by the A.C. motor. When there is a failure of the A.C. motor, as, for example, may be caused by an interruption in the power supplied to the A.C. motor, the internal combustion engine is started automatically, brought up to speed, and the clutch is then engaged. The internal combustion engine then drives the generator. During the transitional period when the load is being shifted from one prime mover to the other, the kinetic energy of the flywheel or D.C. machine is utilized to maintain the rotation of the generator.

The prior art shows the number of patented devices that supply uninterruptible power to an external load. U.S. Pat. No. 2,688,704 describes a motor-generator-engine assemblage arranged so as to provide a constant source of electrical power. This device employs a clutch as the switching arrangement. U.S. Pat. No. 3,221,172 is a no-break power supply employing a differential between the primary motor and the standby motor. U.S. Pat. No. 3,305,762 discloses an improved method for maintaining the supply of electrical energy to a load during an interruption of the normal supply of electrical power. This device employs a clutch of the eddy current type. U.S. Pat. No. 3,458,710 is an emergency power system providing an uninterrupted power source having an electric generator for supplying energy to a load, a first motor adapted to be connected to a source of power external as a power system, and a second motor for driving the generator. This system also provides an auxiliary generator driven by a diesel engine for supplying the second motor through a relay connection. Finally, U.S. Pat. No. 3,810,116 relates to systems for capturing the information stored in a volatile semiconductor memory during the loss of electric power.

Typically, these prior art uninterruptible power supplies have a number of disadvantages. In certain devices, the clutch or differential is a weak mechanical link in the system and from time to time requires replacement. Generally speaking, the internal combustion engine, clutch, flywheel, a generator, and A.C. motor must be mounted end-to-end with their respective shafts coupled together. This creates a power supply of considerable physical length which can be difficult to install in a small area. Auxiliary controls must be provided to start the internal combustion engine, to bring it up to speed, and to engage the generator at the proper time. Many of the prior art devices do not operate as load isolators from the power line during normal operations. As a result, fluctuations in electrical power, such as brownouts, would continue to affect the external load.

In order to overcome these problems associated with the prior art, the present applicant developed uninterruptible power systems that are the subject of several patents. For example, U.S. Pat. No. 4,460,834, issued on Jul. 17, 1984 to the present applicant, describes an uninterruptible power system for providing an uninterruptible power supply to an external load. The power system includes a flywheel generator, a first motor, a standby generator, and a transfer controller. The flywheel generator is adapted to supply power to the external load. The first motor is drivingly connected to the flywheel generator. The first motor is adapted to be connected to a source of power external to the power system. The standby generator is electrically connected to the first motor. A standby motor is drivingly connected to the standby generator. The transfer controller is adapted to switchably interconnect the first motor to the source of power and to interconnect the standby generator to the first motor.

U.S. Pat. No. 4,686,375, issued on Aug. 11, 1987 also to the present applicant, shows an uninterruptible power supply co-generation system which includes a first generator connected to a primary external load, a second generator connected to a secondary external load, and a prime mover connected to the first and second generators by a common shaft. The first generator is electrically isolated from the secondary external load. The prime mover is an internal combustion engine that supplies rotational movement to the common shaft. The secondary external load is the electrical utility. A thermal recovery system is connected to the internal combustion engine.

U.S. Pat. No. 8,227,938, issued on Jul. 24, 2012 also to the present applicant, discloses a batteryless starter for an uninterruptible power system. This uninterruptible power systems includes a motor generator means for conditioning electric power, a backup generator means having an internal combustion engine having an electrically-driven starter so as to provide backup electric power, an electrical switch that is electrically connected to power mains and to the electrical output of the backup generator and to the electrical input of the motor generator for selectively switching power from the electric means and the backup generator to the motor generator. The starter switch is electrically connected to the output of the motor generator and electrically connected to the input of the starter system for switchably connecting the output of the motor generator to the starter.

A variety of other patents have also issued relating to such uninterruptible power systems that address certain problems found in the prior art. For example, U.S. Pat. No. 5,053,635, issued on Oct. 1, 1991 to G. West, provides an uninterruptible power supply with a variable speed drive which drives a synchronous motor/generator. The synchronous motor/generator and the variable speed drive are connected to inductively accelerate the motor/generator to near synchronous speed. When the motor/generator assembly reaches near synchronous speed, the motor/generator is switched to synchronous operation, while still under control of the variable speed drive. The variable speed drive is connected to maintain synchronicity with the motor/generator during acceleration.

U.S. Pat. No. 5,646,458, issued on Jul. 8, 1997 to Bowyer et al., provides an uninterruptible power supply that provides conditioned AC power to a critical load. This uninterruptible power system includes a variable speed drive that operates in response to AC utility power or to a standby DC input by providing a motor drive signal. The uninterruptible power supply power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the power conditioning unit and the standby DC power source are initially operated in response to the utility AC power. The flywheel motor-generator stores kinetic energy in a rotating flywheel. When an outage occurs, the rotating flywheel continues to operate the flywheel motor-generator of the standby DC power source so as to cause the production of AC power which is rectified and provided as standby DC power to operate the variable speed drive of the power conditioning unit until either the utility AC power outage is over or a standby emergency generator is brought on line.

U.S. Pat. No. 5,767,591, issued on Jun. 16, 1998 to J. F. Pinkerton, discloses a method and apparatus for providing startup power to a genset-backed uninterruptible power supply. In this apparatus, the flywheel energy storage device produces three-phase AC voltage and is used to provide temporary power to a critical load while a backup power supply, such as a diesel generator set is accelerated to full speed. The startup power for the genset is also provided from the flywheel energy storage device through a circuit that converts the AC voltage at one level to DC voltage at a lower level.

U.S. Pat. No. 5,811,960, issued on Sep. 22, 1998 to Van Sickle et al., teaches a batteryless uninterruptible power supply. This power supply converts mechanical rotation generated by a local power source to electrical power in the event of commercial line power distortion or failure. The uninterruptible power supply uses a voltage and frequency-tolerant rectifier-inverter combination that converts the decaying output of a de-accelerating synchronous alternating current machine to a stable alternating current voltage for driving a critical load.

U.S. Pat. No. 9,577,471, issued on Feb. 21, 2017 to the present applicant, discloses a power supply system for providing a uninterruptible power supply to an extra load. This power system has a first motor adapted to be connected to a source of power, a flywheel/generator adapted to supply power to the external load, a standby generator switchable a electrically connected to the flywheel/generator, and a second motor drivingly connected to the generator/motor into the internal combustion engine. The second motor is electrically connected to the power supplied by the flywheel/generator. The first motor is drivingly connected to the flywheel/generator. The flywheel/generator is electrically isolated from the source of power. The standby generator has an internal combustion engine that is drivingly connected to a generator/motor. The generator/motor is adapted to supply power to the flywheel/generator or to the external load upon a change in power supplied by the flywheel/generator or the source of power.

A problem associated with these prior art mechanisms is the amount of delay involved in bringing the internal combustion engine up to a synchronous speed for the production of power. In most circumstances where an internal combustion engine is used or, in particular, a diesel engine is used, a starter is required in order to charge a flywheel to begin the operation of the engine. The starter is typically powered by DC power. As such, there is a small delay (of approximately four to six seconds) in achieving full power production from the engine. As such, a need has developed so as to provide a system whereby the internal combustion engine can be accelerated more quickly and brought up to synchronous speed in a rapid manner.

Engine starters are somewhat notorious for unreliable operation. As such, whenever the ability to start the internal combustion engine is dependent upon a starter, users of the uninterruptible power supply system are often concerned that if there were a failure of the starter, the backup generator would not be effective in maintaining the uninterruptible load. As such, a redundant system is felt to be desirable so as to assure that internal combustion engine is always operable, even in the event of starter failure.

It is an object of the present invention to provide a power supply system that increases the reliability of successful start-up of the combustion engine.

It is in another object of the present invention to provide a faster way of accelerating an engine to full speed.

It is another object of the present invention to provide a power supply system that has minimal controls and electronics.

It is another object of the present invention to provide a power supply system that avoids failures.

It is a further object of the present invention to provide a power supply system that includes a minimal number of moving parts.

It is a further object of the present invention to provide a power supply system that avoids the use of batteries.

It is still another object of the present invention to provide a power supply system that inherently avoids engine over speed.

These and other objects and advantages of the present invention will become apparent from a reading of the attached specification and appended claims.

BRIEF SUMMARY OF THE INVENTION

The present invention is a power supply system that comprises a regulated power source having a flywheel with a shaft and a synchronous machine integrated thereto, an electrical generator electrically interconnected to the regulated power source, an engine having a main shaft integral with or coupled to a shaft of the electrical generator, a power supply, and a switch connected between the electrical generator, the power supply and the regulated power source. The switch transfers power from the regulated power source to the electrical generator so as to cause the electrical generator to rotate the shaft of the electrical generator in order to rotate the shaft of the engine.

The regulated power source comprises a synchronous machine whose rotor is mounted on the shaft of the regulated power source together with a flywheel. The regulated power source is connected to the switch. The synchronous machine includes an excitation stator winding, an excitation rotor winding cooperative with the excitation stator winding, a main stator winding, a main rotor winding cooperative with the main stator winding, and a squirrel cage winding cooperative with the main stator winding and the main rotor winding. The excitation rotor winding, the squirrel cage winding, and the main rotor winding are rotatable with a rotation of the shaft of the regulated power source. A voltage controller is electrically connected to the excitation stator winding so as to cause a voltage to develop in the main stator winding so that power flows out of the regulated power source as the flywheel rotates. A rotating rectifier is affixed to the shaft of the regulated power source. The rotating rectifier is cooperative with the excitation rotor winding and the main rotor winding.

The regulated power source has a synchronous machine whose rotor is mounted on the shaft of the regulated power source, together with a flywheel. The regulated power source is connected to the switch.

The synchronous machine has an excitation stator winding, an excitation rotor winding cooperative with the excitation stator winding, a main stator winding, a main rotor winding cooperative with the main stator winding, and a squirrel cage winding cooperative with the main stator winding and the main rotor winding. The excitation rotor winding, the squirrel cage winding, and the main rotor winding are rotatable with a rotation of the shaft of the regulated power source. A voltage regulator is electrically connected to the excitation stator winding so as to cause a voltage to develop in the main stator winding so that power flows out of the regulated power sources as the flywheel rotates. A rotating rectifier is affixed to the shaft of the regulated power source. The rotating rectifier is cooperative with the excitation rotor winding and the main rotor winding.

The electrical generator includes a synchronous generator. The synchronous generator has a main stator winding, a main rotor winding cooperative with the main stator winding, a squirrel cage winding cooperative with the main stator winding and the main rotor winding, an excitation stator winding, and an excitation rotor winding cooperative with the shaft of the electrical generator and cooperative with the excitation stator winding and also cooperative with the main rotor winding. A rotating rectifier is affixed to the shaft and is electrically connected to the excitation rotor winding and the main rotor winding. An automatic voltage regulator is electrically connected to the main excitation stator winding so as to monitor and control voltage to the synchronous generator. The shaft of the electrical generator is integral with or drivingly connected to the shaft of the engine. After engine start-up, a load can be connected to the electrical generator such that the electrical generator supplies power to the load independent of the power supply.

The switch electrically connects the regulated power source to the power supply or electrically connects the electrical generator to the regulated power source. The switch has an incoming power switch and an outgoing power switch. An interlocking system is used so that only one switch can be in a closed position at any given moment. The incoming power switch is in a closed position so as to supply power from the power supply to the regulated power source. The incoming power switch is in an open position so as to disconnect the power supply and allow for the outgoing power switch to close. The outgoing power switch is in a closed position so as to supply power from the regulated power source. The outgoing power switch is in an open position so that the incoming power switch may be allowed to close. The incoming power switch is in the closed position and the outgoing power switch is in the open position so as to supply power to the regulated power source from the power supply. The incoming power switch is in the open position and the outgoing power switch is in the closed position so that power flows from the regulated power source to the electrical generator.

In the preferred embodiment of the present invention, the engine is an internal combustion engine. The power supply is a three-phase AC power supply. The electrical generator is a synchronous generator which acts as an induction motor when the switch causes power from the regulated power source to flow to the electrical generator. The synchronous generator acts as an induction motor and is cooperative with the shaft of the engine so as to cause the shaft of the engine to rotate.

The present invention is also a system for starting an engine in which the engine has a shaft. The system includes a regulated power source having a synchronous machine having a rotor and a flywheel mounted on a shaft, an the electrical generator electrically interconnected to the regulated power source, a power supply, and a switch connected between the electrical generator, the power supply and the regulated power source. The electrical generator has a shaft that is coupled to or integral with the shaft of the engine. The switch causes power to flow from the regulated power source to the electrical generator when engine start-up is required so as to cause the electrical generator to act as an induction motor. This induction motor acts so as to start a rotation of the shaft of the engine.

The present invention is a method, arrangement and device for increasing the reliability of the successful start-up of combustion engines. When combustion engines are used for electrical power generation, they are mechanically coupled to electrical generators. The present invention utilizes the coupled electrical generator as a motor for engine cranking during start-up operation. The power supply system includes a regulated power source that can be actuated to provide electrical power to the generator and cause it to act as a motor. Because the effectiveness and reliability of the start-up is a primary objective of the present invention, the power supply system described herein is an electromechanical device having minimal controls and minimal electronics.

In the present invention, the engine is mechanically coupled to the electrical generator and is used for generating electric power. The present invention, at times, uses the electrical generator as a motor for driving the main shaft of the engine during engine start-up. When the electrical generator is used as a motor, it receives electrical power from the regulated power source, which will produce an adequate amount of torque to turn the main shaft of the combustion engine during startup. The regulated power source also provides enough energy for turning the main shaft of the combustion engine without exceeding power parameters that could cause damage to any of the components.

After start-up, once the combustion engine is producing enough power to accelerate to its rated speed without any additional external power, the generator can either be disconnected from the regulated power source in order to be connected to an independent external load or it can produce power directly to the regulated power source in case the regulated power source has bidirectional power handling capability or can remain connected to the regulated power source and also be connected in parallel to an external load.

In the present invention, the power supply system is capable of being actuated in order to commence engine startup, to ensure that enough torque is produced in the generator when it acts as a motor to turn the engine shaft and accelerated to start-up speed, and to ensure that the electrical power parameters delivered to the generator do not exceed those that would be safe for all components involved.

In one embodiment, the regulated power source can have a synchronous generator mounted to the shaft and housing frame of the regulated power source. The synchronous generator is electrically independent from the rest of the power supply system. The synchronous generator is electrically connected to an independent load other than the electrical generator and the power supply. As such, it is able to supply power from the synchronous generator on the regulated power source to the independent load. In this embodiment, the power delivered by the synchronous generator is used as an uninterruptible power supply.

This foregoing Section is intended to describe, with specificity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
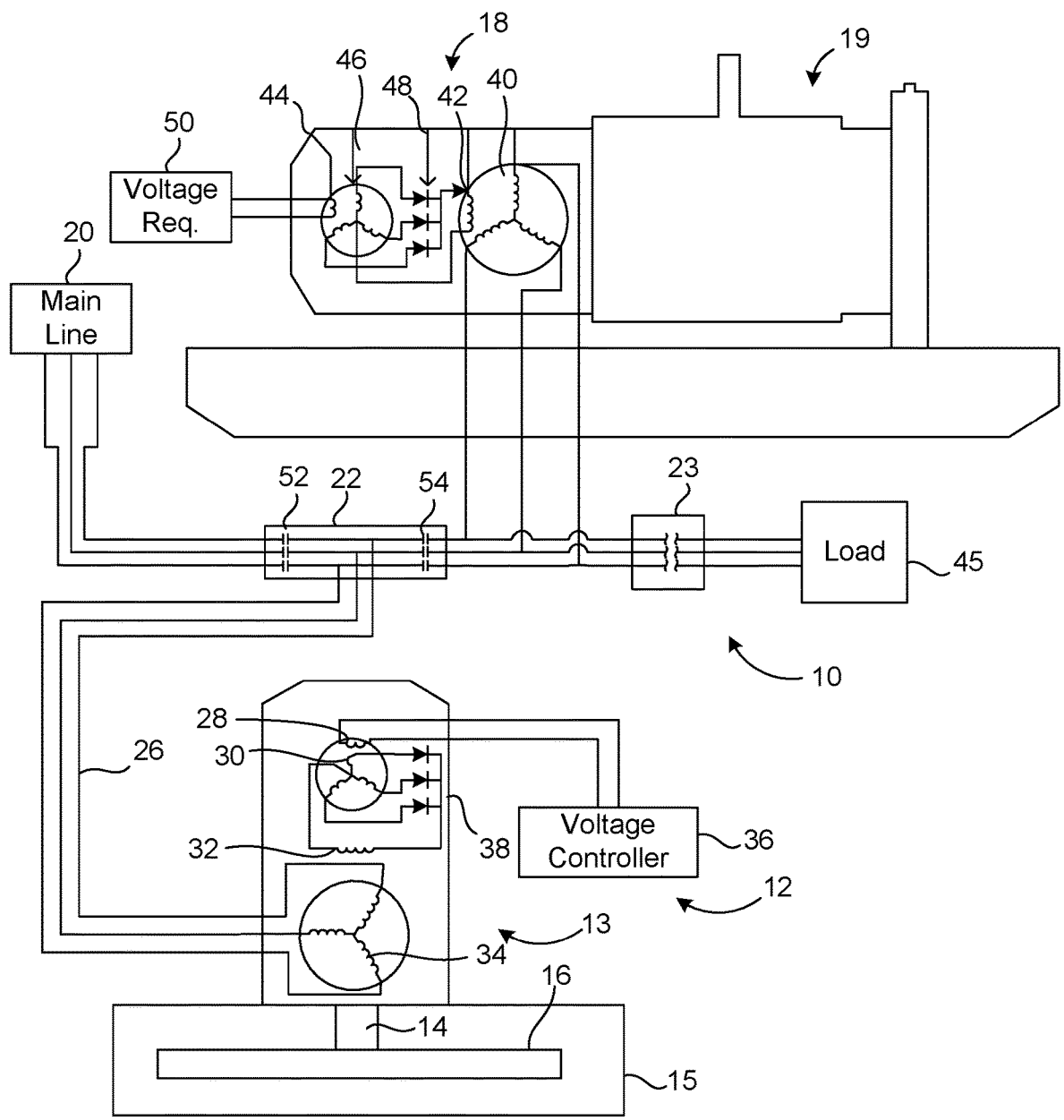
FIG. 1 is a diagrammatic illustration of the power supply system of the present invention.

Referring to FIG. 1, there is shown the power supply system 10 in accordance with a preferred embodiment of the present invention. The power supply system 10 includes a regulated power source 12 having a synchronous machine 13 with a shaft 14 and a flywheel 16 in a housing frame 15, an electrical generator 18 electrically connected to the regulated power source 12, an engine 19, a power supply 20, and a switch 22 that is connected between the electrical generator 18, the power supply 20 and the regulated power source 12. The switch 22 transfers power from the regulated power source 12 to the electrical generator 18 so as to cause the electrical generator 18 to rotate a shaft of the electrical generator in order to correspondingly rotate a shaft of the engine 19.

In FIG. 1, the regulated power source 12 includes a synchronous machine that acts as a synchronous motor or a synchronous generator with the shaft 14. The regulated power source 12 has an incoming/outgoing power line 26 connected to the switch 22.

The synchronous machine 13 of the regulated power source 12 includes an excitation stator winding 28, an excitation rotor winding 30, a main rotor winding 32, a squirrel cage winding 72, and a main stator winding 34. A voltage controller 36 is electrically connected to the excitation stator winding 28 so as to cause a voltage to develop in the main stator winding 34 so that power flows out of the regulated power source 12 as the flywheel 16 rotates the shaft 14. A rotating rectifier 38 is affixed to the shaft 14 of the regulated power source 12. The rotating rectifier is cooperative with the excitation rotor winding 30, the main rotor winding 32, and the main stator winding 34. The regulated power source 12 can be switchably electrically connected to a load so as to supply power from the regulated power source 12 to the load. The switch 22 electrically connects the regulated power source 12 to the power supply 20 or electrically connects the electrical generator 18 to the regulated power source 12 so as to supply power from the regulated power source 12 to the electrical generator 18, which will act as a load during start up.

The electrical generator 18 in one form is a synchronous generator. The synchronous generator includes a main stator winding 40, a main rotor winding 42, a squirrel cage winding 64, an excitation stator winding 44 and an excitation rotor winding 46. The main rotor winding 42, the squirrel cage winding 64, and the excitation rotor winding 46 are cooperative with the shaft so as to rotate with a rotation of the shaft of the electrical generator 18. A rotating rectifier 48 is affixed to the shaft of the electrical generator 18 and electrically connected to the excitation rotor winding 46 and to the main rotor winding 42. An automatic voltage regulator 50 is electrically connected to the excitation stator winding 44 so as to monitor and control voltage to the synchronous generator of the electrical generator 18. After successful engine startup, an independent load 45 can be connected to the electrical generator 18 by way of an additional switch 23 such that the electrical generator 18 supplies power to the load 45 independent of the power supply 20. The additional switch 23 may be a conventional single switch (as shown in FIG. 1) or it can be a double transfer switch that will power the load 45 from either the generator 18 or the power source 20.

The switch 22 has an incoming power switch 52 and an outgoing power switch 54. There is an interlocking system that allows for only one of the switches to be closed at any given moment. The incoming power switch 52 is in a closed position so as to supply power from the power supply 22 to the regulated power source 12. The incoming power switch 52 is in an open position so as to disconnect the power supply 20 from the regulated power source 12 and allow the outgoing power switch 54 to close. The outgoing power switch 54 is in a closed position so as to supply power from the regulated power source 12 to the electrical generator 18. The outgoing power switch 54 is in an open position so that the electrical generator 18 is disconnected from the regulated power source 12 and allow for the incoming power switch 52 to close.

The incoming power switch 52 is in a closed position and outgoing power switch 54 is in an open position so as to supply power from power supply 20 to the regulated power source 12. The incoming power switch 52 is in the open position and the outgoing power switch 54 is in the closed position so that power flows from the regulated power source 12 to the electrical generator 18.

In the present invention, the engine 19 is an internal combustion engine. The power supply 20 is a three-phase AC power supply. The electrical generator 18 is a synchronous generator that acts as an induction motor when the switch 22 causes power to flow from the regulated power source 12 to the electrical generator 18 during engine start-up. This induction motor is cooperative with the shaft of the engine so as to cause the shaft of the engine to rotate.

The power supply system 10 can be used for engine start-up as follows. Initially, the regulated power source 12 (which is a synchronous machine with a flywheel) is accelerated by the synchronous machine acting as a synchronous motor so as to remain at its nominal speed, which is also its synchronous speed. This occurs by being connected by the switch 22 to the power supply 20. This power supply 20 can be the mains power lines. When it is desired that the engine 19 start, the start-up will commence by opening the incoming power switch 52. Simultaneously, the voltage controller 36 will halt excitation to the synchronous machine 13 of the regulated power source 12. Then, the outgoing power switch 54 will be closed. Because the excitation is off, this will permit for a low transient when closing the outgoing power switch 54. As a result, the power supply system 10 will not experience any electrical or mechanical power conditions that are damaging to the components. After closing the outgoing power switch 54, the synchronous machine 13 of the regulated power source 12 will connect to the electrical generator 18.

Because the synchronous machine 13 of the regulated power source 12 is not connected to any incoming external power source, and because it is spinning, the synchronous machine of the regulated power source 12 will now act as a generator that delivers the accumulated kinetic energy in the flywheel 16 to drive the electrical generator 18 as an induction motor. It will do this by means of the voltage controller 36 so as to deliver power to the excitation stator winding 28. This causes a voltage to be developed to the leads of the main stator winding 34. Therefore, power will flow out from the synchronous machine 13 of the regulated power source 12.

When this occurs, because the electrical generator 18 is at a stand-still, and because its rotor has a squirrel cage winding 64, and because it can be fed electrical power to the leads of the main stator winding 40, the electrical generator 18 will act as an induction motor. As such, it develops higher torque as voltage originating in the synchronous machine 13 of the regulated power source 12 is increased. During this phase, the leads of the main rotor winding 42 will be connected in to each other by way of the rotating rectifier 48 (to be described hereinafter). This allows for even further torque to be developed. This torque will cause the shaft of the electrical generator 18 to turn. As such, the shaft of the engine 19, which is coupled to the shaft of the electrical generator, will also turn. The shaft of the engine 19 will continue to accelerate as it turns. It will eventually meet the required turning conditions of the engine shaft so as to allow for combustion to occur in the engine 19.

At this point in time, the regulated power source 12 can either be disconnected or can remain engaged. If the regulated power source 12 is disconnected, the engine 19 will continue to accelerate to synchronous speed using an engine speed governor through combustion power alone. If the regulated power source 12 remains engaged, it can assist in the acceleration of the engine and thus reduce the time to bring the engine to full speed. The voltage controller 36 will regulate the power required at each stage of the acceleration so as to optimize this operation as well as to protect the components for power conditions that might damage any of the components. If the synchronous machine 13 of the regulated power source 12 remains engaged during acceleration, it will supply power to the electrical generator 18 as long as the synchronous machine 13 is spinning faster than the electrical generator 18. Once their speeds are matched, the engine 19 will continue to supply power to reach the synchronous speed and will then provide energy to the synchronous machine 13 of the regulated power source 12 to recover the speed and kinetic energy that was lost during the start-up. This can occur if either the voltage controller 36 or the automatic voltage regulator 50 is engaged. This is because of the fact that both the synchronous machine 13 of the regulated power source 12 and the electrical generator 18 have squirrel cage windings. Either can act as an induction motor as long as the other is spinning faster, and with excitation, acting as a synchronous generator. However, the simultaneous operation of both the voltage controller 36 and the automatic voltage regulator 50 is carefully coordinated to prevent damaging transient conditions.

Any over-speed of the engine 19 cannot occur by the present invention because the regulated power source (i.e. the regulated power source 12) is spinning at synchronous speed and frequency, which are equal for both the regulated power supply 12 and the generator 18. It cannot supply electrical power or torque to the engine 19 if the electrical generator 18 is spinning faster than the synchronous frequency. Therefore, the system is protected against over-speed during start-up.

After the engine 19 reaches the nominal synchronous speed of the electrical generator 18, the regulated power source 12 can be disengaged by suspending power supplied by the voltage controller 36 and immediately disconnected by opening the outgoing power switch 54. Then, the incoming power switch 52 will be closed and the voltage controller 36 will resume its operations so that the regulated power source 12 remains ready for any subsequent starting requirements that might arise later.

At this point, the engine 19 and the electrical generator 18 are ready to deliver power to external load 45 by way of closing external switch 23 to that load 45 and allowing the automatic voltage regulator 50 to supply power to the exciter stator winding 44 of the electrical generator 18. The engine 19 and the electrical generator 18 will continue to operate normally, with normal run and stop functions. After engine shutdown, if start-up is required again, this method will be repeated.

The rotating rectifier 48 in the electrical generator 18 can be specially designed to function so that the rotating rectifier 48 will connect both ends of the main rotor winding 46 during cranking operations in order to improve the motor rising torque produced by the electrical generator 18.

The method of the present invention is easy to apply since it is applicable to most traditionally commercially available gen-sets. The rotating rectifier 48 will mimic its functionality for synchronous motors during starting conditions. The system of the present invention can be used in addition to any traditional method of engine starting. It can therefore result in a redundant configuration that increases reliability of engine-startup. The electrical generator 18 can also be electromagnetically designed for optimizing the performance of this starting method.

Figure 2:
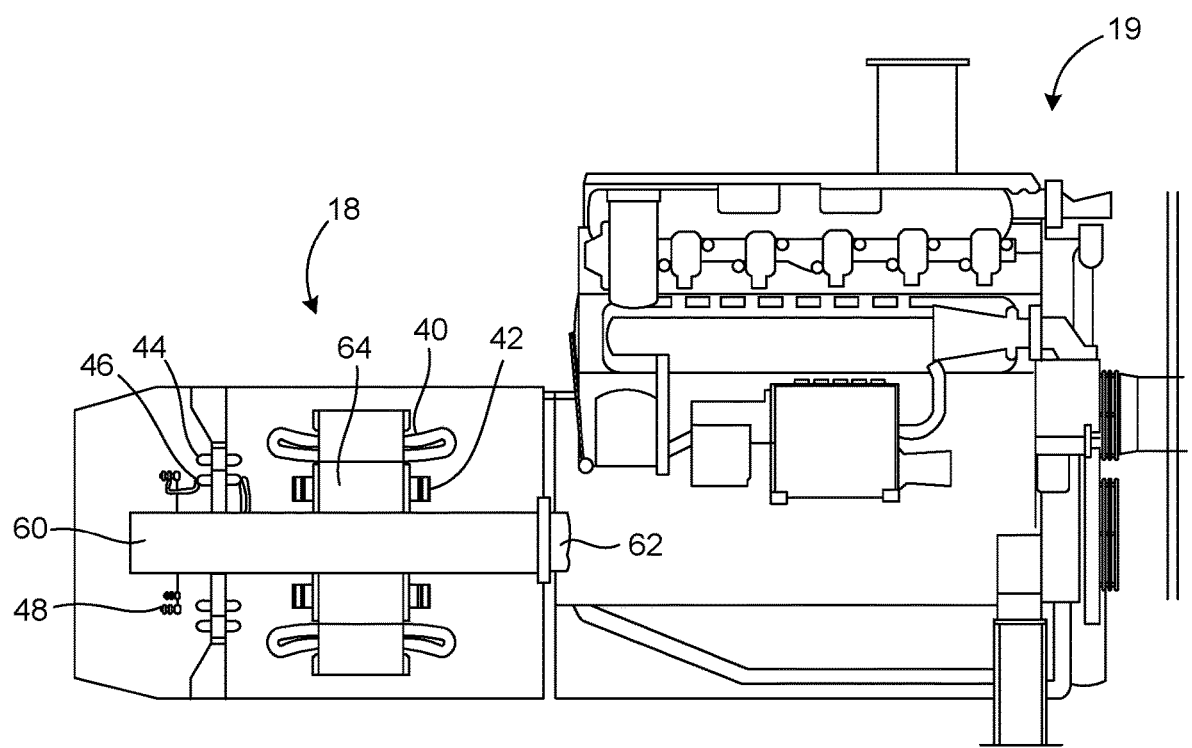
FIG. 2 is a cross-sectional view showing the electrical generator and engine of the power supply system of the present invention.

FIG. 2 is a cross-sectional view showing the configuration of the electrical generator 18 and the engine 19. As can be seen, the electrical generator 18 has a shaft 60 positioned therein. Shaft 60 can be coupled to the shaft 62 of the engine 19. Alternatively, the shaft 60 of the electrical generator 18 can be integral with the shaft 62 of the engine 19. The squirrel cage winding 64 and the main rotor winding 42 are mounted on the shaft 60 so as to rotate with the rotation of the shaft 62. The electrical generator 18 includes the main stator winding 40, the main rotor winding 42 and the squirrel cage winding 64. The electrical generator 18 also includes the excitation stator winding 44 and the excitation rotor winding 46. A rotating rectifier 48 is affixed to the shaft 60 so as to rotate with the rotation of the shaft 62. Similarly, the excitation rotor winding 46 will also rotate with the rotation of the shaft 60.

In FIG. 2, it can be seen that the engine 19 is an internal combustion engine. The electrical generator 18 and the engine 19 can be mounted together so that the shafts 60 and 62 thereof can be easily connected or coupled.

Figure 3:
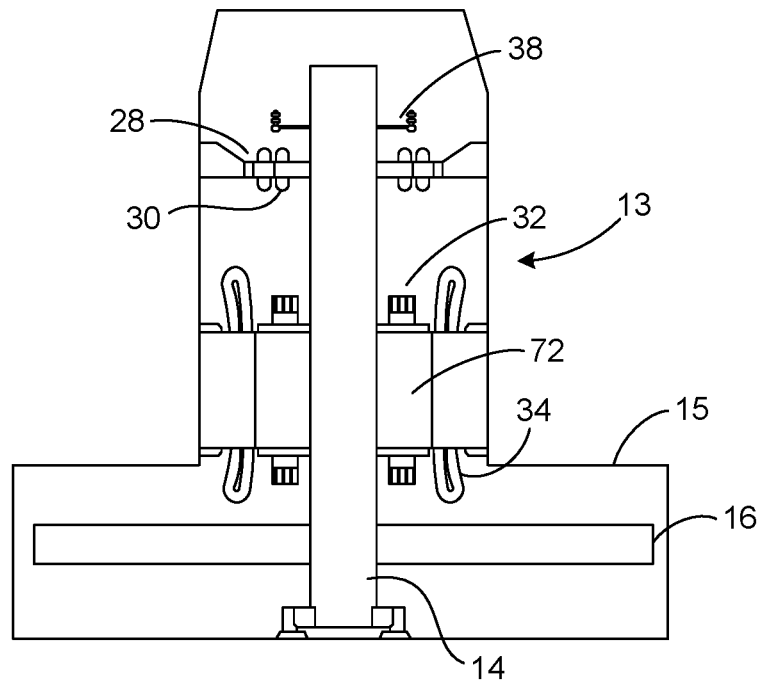
FIG. 3 is a cross-sectional view of the regulated power source of the present invention.

FIG. 3 is a cross-sectional view showing the regulated power source 12 of the present invention. The regulated power source 12 includes the flywheel 16 and the shaft 14. The flywheel 16 is mounted to the shaft 14 and extends upwardly within the housing frame 15 of the regulated power source 12. The synchronous machine 13 of the regulated power source 12 has the main stator winding 34, the main rotor winding 32 and a squirrel cage winding 72. The squirrel cage winding 72 is cooperative with the main rotor winding 32 and the main stator winding 34. The main rotor winding 32 and the squirrel cage winding 72 will rotate with the rotation of the shaft 14. The synchronous machine 13 of the regulated power source 12 further includes the excitation stator winding 28, the excitation rotor winding 30 and a rotating rectifier 38. The rotating rectifier 38 and the excitation rotor assembly 30 will rotate with the rotation of the shaft 14.

Figure 4:
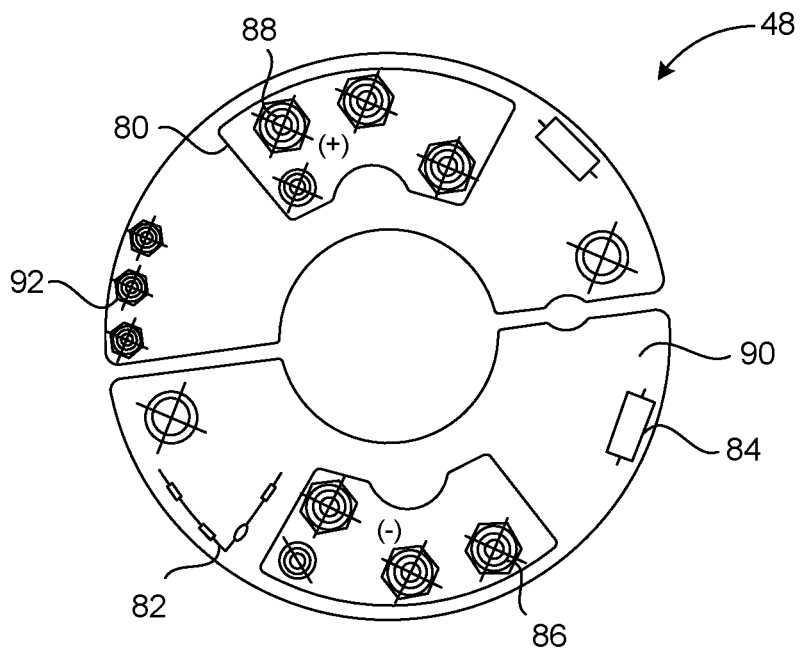
FIG. 4 is a plan view showing the rotating rectifier as used in the present invention.

FIG. 4 illustrates the rotating rectifier 48 as used in the electrical generator 18 of the present invention. The rotating rectifier 48 is a bridge rectifier which it is mounted on a rotor. Neither brushes nor slip rings are used. As such, the rotating rectifier 48 serves to reduce the number of wearing parts. The main alternator has a rotating field and a stationary armature (i.e. power generation windings). By means of the voltage regulator 50 varying the amount of current through the stationary exciter stator windings 44, in turn, varies the three-phase output from the excitation rotor winding 46, which is rectified to direct current in the rotating rectifier 48 to feed the main rotor winding 40.

The rectifier 48 includes a DC bus 100 and 102, a fast recharge diode 82, resistors 84, anode diodes 86, and cathode diodes 88. These components are mounted on the rectifier rotor 90 which can be a fixed to the shaft 60 of the electrical generator 18. Zener diodes 92 are also provided on the rectifier rotor 90.

Figure 5:
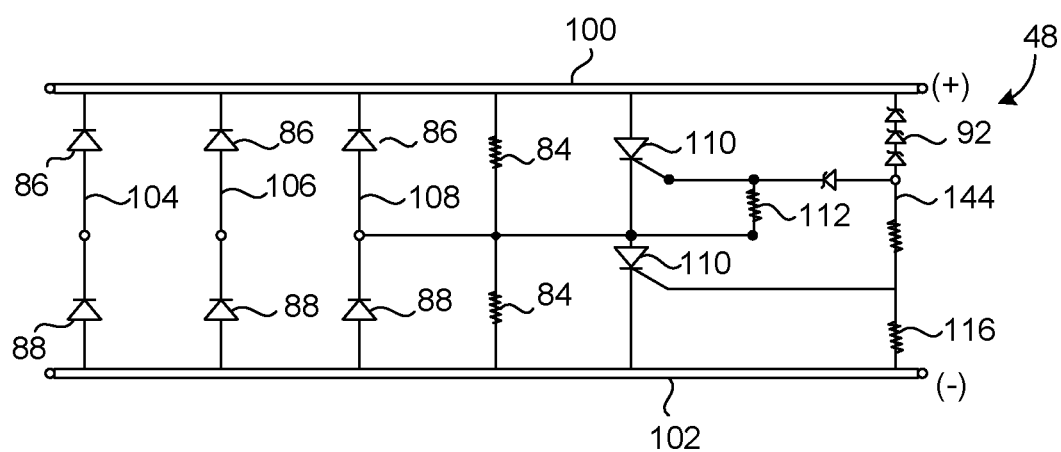
FIG. 5 is an electrical schematic of the rotating rectifier as used in the present invention.

FIG. 5 illustrates the electrical schematic associated with the rotating rectifier 48 of the present invention. In the schematic diagram, there is a positive DC bus 100 and a negative DC bus 102. Line 104 is connected between the positive DC bus 100 and the negative DC bus 102. Line 104 includes the anode diode 86 and the cathode diode 88. Line 106 also extends between positive DC bus 100 and negative DC bus 102. Line 106 has the anode diode 86 thereon and the cathode diode 88 connected in series. Line 108 also extends between positive DC bus 100 and negative DC bus 102. Line 108 further includes the anode diode 186 and the cathode diode 88. Resistors 84 are placed on the line extending between the positive DC bus 100 and negative DC bus 102. The SCR 110 controls the flow of electricity across the DC bus between the positive DC bus 100 and the negative DC bus in short-circuit during start-up. SCRs 110 are activated by line 114 which includes the Zener diode 92 along with resistors 114 and 116.

After the end of the engine start-up operation described hereinabove and after the engine 19 reaches the nominal synchronous speed of the electrical generator 18, the regulated power source 12 may remain connected to the electrical generator 18. As such, the electrical generator 18 can work either as an induction generator or as a synchronous generator, depending on which excitation system is designated in order to operate in constant running engine conditions. The regulated power source 12 can receive all power produced by the engine 19 and furthermore can have another synchronous generator mounted on to the shaft 14 in order to supply uninterruptible power to an external load without the need for any switching to occur on the output of the synchronous generator.

In an alternative embodiment of the present invention, the regulated power source 212 includes a synchronous machine 213, a housing frame 315, a shaft 214, and a flywheel 216. A synchronous generator 301 is mounted on the housing frame 315 and shaft 214 with the flywheel 216 of the regulated power source 212. The synchronous machine 213 and the synchronous generator 301 each have their own independent voltage regulators, excitation windings and rotating rectifiers. The synchronous generator 301 can supply uninterruptible power to an external load 140 without the need for any switching to occur on the output of the synchronous generator 301. The synchronous generator 301 is electrically independent from the rest of the power supply system. When engine start-up is achieved through the aforementioned method, the engine 219 may deliver power to the regulated power source 212, which in turn delivers power in an uninterruptible fashion to the load 140 via the synchronous generator 301 of the regulated power source 212.

Figure 6:
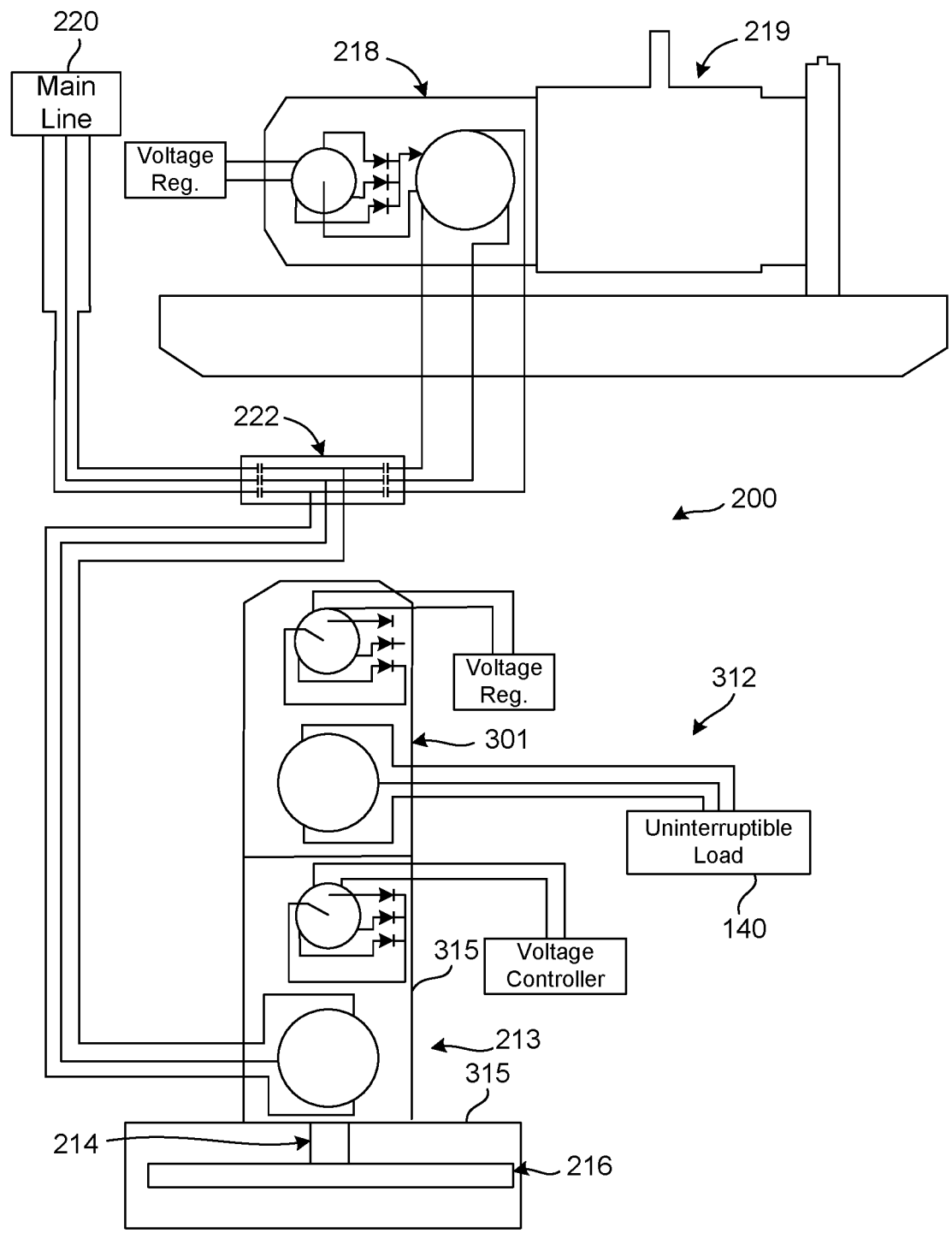
FIG. 6 is a diagrammatic illustration of an alternative embodiment of the power supply system of the present invention.

FIG. 6 shows the alternative embodiment of the power supply system 200 in accordance of the present invention. This alternative embodiment of the power supply system 200 of the present invention includes the regulated power source 212, the electrical generator 218, the engine 219, the power supply 220, and the switch 222. These components are similar to that of the previous embodiment of the present invention, as shown in FIG. 1. Importantly, the regulated power source 212 includes a synchronous generator 301 whose rotor is mounted on the shaft 214 and whose stator is mounted on the common housing frame 315 of the regulated power source 212. Shaft 214 is coupled to the flywheel 216. As such, as the shaft 214 rotates with the rotation of the flywheel 216, this rotation will cause the synchronous generator 301 to produce electricity which can be delivered to the load 140. As such, the load 140 will receive electrical energy from the synchronous generator 301 which creates an electrical power circuit that is electrically isolated from the main power line 220, generator 218, and synchronous machine 213. The configuration of the synchronous generator 301 is similar to the configuration of the electrical generator 18 and the electrical generator 218, as described hereinbefore.

Figure 7:
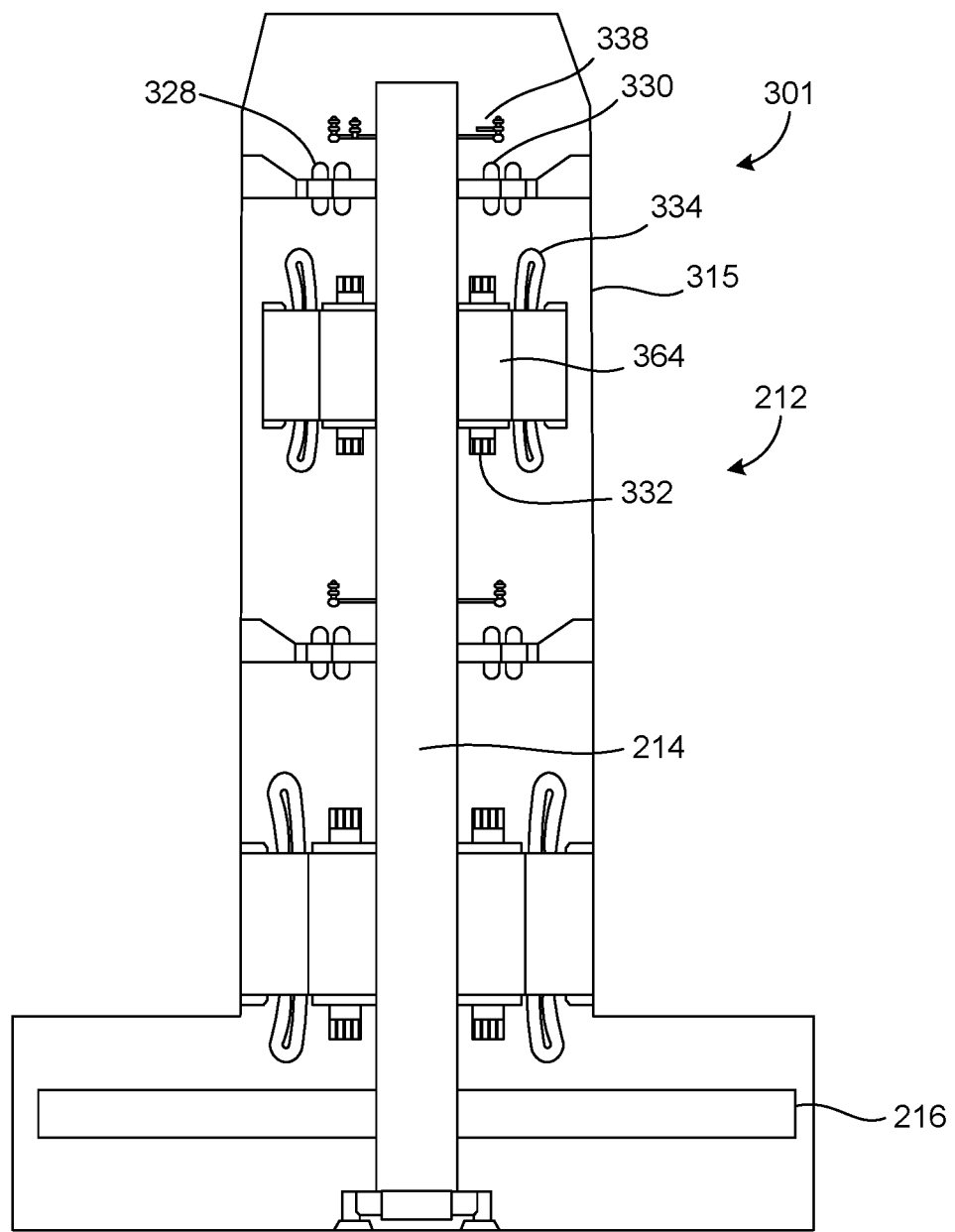
FIG. 7 is a cross-sectional view of the regulated power source of the alternative embodiment of the present invention of FIG. 6.

FIG. 7 is a cross-sectional view of the regulated power source 212 in accordance with the alternative embodiment of the power supply system 200 of the present invention (as shown in FIG. 6). In particular, the regulated power source 212 includes the shaft 214 which is connected to the flywheel 216. The shaft 214 extends vertically upwardly through the housing frame 315 of the regulated power source 212. As with the previous embodiment, the regulated power source 212 has a similar configuration to that of the regulated power source 12 of the previous embodiment except for the fact that the shaft 214 and the housing frame 315 extend upwardly to an additional synchronous generator 301. Synchronous generator 301 can include a rotating rectifier 338, an excitation stator winding 328, an excitation rotor winding 330, a main stator winding 334, a main rotor winding 332, and a squirrel cage winding 364. The excitation rotor winding 330 is connected to the rotating rectifier 338 and will rotate with a rotation of the shaft 214. Similarly, the main rotor winding 332 is cooperative at the squirrel cage winding 364 and with the main stator winding 334. Main rotor winding 332 and squirrel cage winding 364 will also rotate with the rotation of the shaft 214.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A power supply system comprising:
   a regulated power source having a synchronous machine with a flywheel, said flywheel being mounted to a common shaft, said synchronous machine comprising:
   an excitation stator winding;
   an excitation rotor winding cooperative with said excitation stator winding, said excitation winding rotating with a rotation of said common shaft of said regulated power source;
   a main stator winding;
   a main rotor winding cooperative with said main stator winding and rotatable with the rotation of said common shaft of said regulated power source;
   a squirrel cage winding cooperative with said main stator winding and said main rotor winding, said squirrel cage winding being rotatable with the rotation of said common shaft of said regulated power source; and
   a rotating rectifier affixed to said common shaft of said regulated power source, said rotating rectifier cooperative with said excitation rotor winding and said main rotor winding, the power supply system further comprising:
   an electrical generator electrically interconnected to said regulated power source, said electrical generator having a shaft therein;
   an engine having a main shaft integral with or coupled to said shaft of said electrical generator;
   a mains power supply; and
   a switch connected between said electrical generator and said mains power supply and said regulated power source, said switch transferring power from said regulated power source to said electrical generator so as to cause said electrical generator to rotate said shaft of said electrical generator in order to rotate said main shaft of said engine.

2. The power supply system of claim 1, said synchronous machine of said regulated power source driving said common shaft, said regulated power source having a power line, said power line being connected to said switch.

3. The power supply system of claim 1, said regulated power source being switchable by said switch and electrically connected to said mains power supply so as to a supply power from said mains power supply to said regulated power source.

4. The power supply system of claim 1, said switch electrically connecting said regulated power source to said mains power supply or electrically connecting said electrical generator to said regulated power source so as to supply power from said regulated power source to said electric generator.

5. The power supply system of claim 1, said electrical generator comprising:
   a main stator winding;

a main rotor winding mounted on said shaft of said electrical generator, said main rotor winding cooperative with said main stator winding;

a squirrel cage winding mounted to said shaft of said electrical generator and cooperative with said main stator winding;

an excitation stator winding; and an excitation rotor winding mounted to said shaft of said electrical generator and cooperative with said excitation stator winding.

6. The power supply system of claim 5, said electrical generator further comprising:

a rotating rectifier affixed to said shaft and electrically connected to said excitation rotor winding and to said main rotor winding.

7. The power supply system of claim 5, said electrical generator further comprising:

an automatic voltage regulator electrically connected to deliver power to said main stator winding and to said excitation stator winding.

8. The power supply system of claim 1, further comprising:

a load connected to said electrical generator such that said electrical generator supplies power to said load independent of said mains power supply.

9. The power supply system of claim 1, said engine being an internal combustion engine.

10. The power supply system of claim 1, said mains power supply being a three-phase AC power supply.

11. The power supply system of claim 1, said electrical generator operating as an induction motor when said switch causes power to flow from said regulated power source to said electrical generator, the induction motor being cooperative with said main shaft of said engine so as to cause said main shaft of said engine to rotate.

* * * * *